United States Patent Office 3,649,680
Patented Mar. 14, 1972

3,649,680
PURIFICATION OF AROMATIC CARBOXYLIC ACIDS
Alfred J. McNerney, Wallingford, Pa., assignor to Sun Oil Company, Philadelphia, Pa.
No Drawing. Filed Dec. 28, 1967, Ser. No. 694,108
Int. Cl. C07c 51/42, 63/02
U.S. Cl. 260—524 M                10 Claims

ABSTRACT OF THE DISCLOSURE

A process of separating and purifying aromatic carboxylic acids prepared by oxidizing alkyl aromatic hydrocarbons with an aqueous solution of an alkali metal chromate and which oxidation product has been treated with mineral acid to hydrolyze the alkali metal salt of the carboxylic acid to the free acid by interfusing the paste-like crude carboxylic acid mixture so formed with an alcohol-water mixture, separating the solid carboxylic acid and water washing same.

---

This invention relates to the production of aromatic carboxylic acids and more particularly relates to improvements in the purification phase of the production of aromatic carboxylic acids from aromatic hydrocarbons wherein said aromatic hydrocarbons are oxidized by means of an alkali metal chromate. Still more particularly, this invention relates to improvements in the purification phase of the production of aromatic carboxylic acids wherein the residual catalyst metals and problems due to water of hydration in the crude acid are substantially obviated.

BACKGROUND OF THE INVENTION

The oxidation of aromatic hydrocarbons to aromatic carboxylic acids by means of an alkali metal chromate oxidizing agent, such as sodium dichromate to form the corresponding metal salt of the corresponding carboxylic acid is well known in the art. The same is also known in respect to the preparation of aromatic dicarboxylic acids from aromatics containing two alkyl substituents. Typically, the acid itself is recovered by reacting the salt dissolved in water with an acid such as hydrochloric acid to bring about precipitation of the carboxylic acid. The acid precipitate as thus produced is recoverable, however, it is invariably hydrated with sufficient water that it is of a paste-like consistency and consequently contains a significant amount of residual catalyst metal entrapped or otherwise distributed therein. This tacky or sticky amorphous type consistency presents substantial problems in further purification and particularly complicates the removal of both the water of hydration and the residual metal. For instance, in the past practice of vacuum-tray drying, the crude paste-like acid is effected only for removal of the water, however, the residual metal remains with the acid and must be removed in some other fashion. The problem is especially acute with fused ring aromatics such as 2,6-dimethylnaphthalene, probably because of the particle size of such materials. A process which provides an effective, relatively simple, facile and economical means for the purification of paste-like acid is to be highly commended.

SUMMARY OF THE INVENTION

It has now been found that the crude paste-like acid can be readily purified in a simple, facile and economic fashion if the crude paste-like acid is mixed with an alcohol. The mixture is permitted to sufficiently interfuse and the resulting diffusion is followed by separation of the alcoholic liquid phase from the solid acid phase and the separated acid phase is then water washed.

DETAILED DISCUSSION

From time to time hereafter in the detailed discussion, reference may be made to mechanism that is believed to be the reasons behind the success of this process, but it is to be fully understood that notwithstanding the firm belief in the accuracy of any statements made in reference to mechanism, that such is certainly capable of being in error. Accordingly, the teachings herein, and in the appended claims in particular, are not to be regarded as resting on the accuracy thereof. Such comments are only included with the hope of a fuller understanding of the invention and to facilitate putting it into practice in its optimum form with a minimum of effort by those skilled in the art. The true invention in all cases being the positive steps set forth and which can be performed which will produce the desired effect and not the mechanism which inherently ensues from performing said positive steps.

The oxidation and precipitation phases of the present invention are well understood and known to those skilled in the art having been reported on in numerous instances in the literature. However, for the purposes of fullness of disclosure and as a convenience to those artisans desiring same, a brief and limited discussion of said phases will be included. It is to be understood that the present invention is not limited by the brief, curtailed discussion of those phases not forming a part of the heart of the invention.

With regard to the oxidizing agents, these include the known oxidizing chromates which broadly speaking are the alkali metal chromates and mixtures thereof. Examples of such oxidizing agents are sodium dichromate and potassium dichromate. Normally stoichiometric amounts of the chromate and hydrocarbon are employed. The alkali metal chromate is preferably employed in an aqueous solution of about 35% to 45% concentration.

Typically, the oxidation is carried out at a temperature in the range of about 500° to 540° F. Frequently, it is advantageous to employ a temperature in the range of about 510° to 520° F. The pressures employed are simply those of autogenous pressure which obtain at reaction temperatures.

The aromatics which may be oxidized, hydrolyzed and the carboxylic acid purified therefrom by this invention are generally speaking those same ones oxidized by the prior art process comprising mono and dialkyl substituted aromatics containing from about 7 to 50 carbon atoms, for example, toluene; xylenes (especially the 1,4-isomer); ethylbenzene; 1,2,4,5- and the other tetramethylbenzenes, octylbenzene; eicosylbenzene; diethylbenzene, methyl propylbenzene; ethyl hexylbenzene; dihexylbenzene; butyl dodecylbenzene, methyl tetradecylbenzene; didodecylbenzene; ethyl eicosylbenzene; and dieicosylbenzene. The important 1,4- disubstituted compounds of the foregoing are definitely suitable. Other examples are methylnaphthalenes, ethylnaphthalenes; eicosylnaphthalenes; dimethylnaphthalenes, such as 1,4-dimethylnaphthalene, 1-methyl-6-ethylnaphthalene, 2,6-dimethylnaphthalene, 1-methyl-5-hexylnaphthalene, 1-propyl-8-pentylnaphthalene, 2-ethyl-7-nonylnaphthalene, 2-butyl-6-decylnaphthalene, 2,6-dibutylnaphthalene, 2,7-dihexylnaphthalene, 2-pentyl-6-dodecylnaphthalene, 2,6-dieicosylnaphthalene and the like, and mixtures of the foregoing. The process is especially suitable for the fused ring aromatics and 2,6-dimethylnaphthalene in particular.

The oxidation results in the formation of the corresponding alkali metal salt of the carboxylic acid and this is readily converted to the acid by a hydrolysis carried out with an aqueous solution of any of the common mineral acids, such as sulfuric and hydrochloric acid, however, sulfuric is generally preferable. Typically, a concentration of at least about 30% to 35% sulfuric acid by volume is used although more dilute solutions can be employed with success. Normally the crude oxidation mixtures are filtered before the precipitation with mineral acid is carried out.

The aromatic carboxylic acid which is produced by the aforementioned hydrolysis precipitates from the aqueous solution but because of the water present the precipitate settles out in a hydrated form in a paste-like consistency which complicates further purification of the acid.

As those skilled in the art know well, the acid so formed and having this paste-like consistency contains a significant amount of residual alkali metal employed in the oxidation step. It is at this point the present invention finds its application in the purification of the acid and this inventive purification will now be described in detail.

The alcohol that may be employed to break down the paste-like structure of the crude acid may be any alkanol of between 1 and 3 carbon atoms, however, methanol is by far preferred because of its availability, expense and more importantly its diffusion efficacy here. This treatment, with alcohol, is to be carried out at a temperature of about that of an ice bath to below the boiling point of methanol and preferably is carried out at about room temperature.

One very important feature of the alcohol treatment is the time allotted for the treatment. Although this treatment is not unduly long, some time is involved and specifically some time is involved in breaking down the paste-like material so that it can be sufficiently diffused in the alcoholic solution. Of course, the amount of water and alcohol employed is quite an important factor affecting the diffusion time. Using a ratio about ½/1 to 2/1 by volume of the alcohol to the aqueous crude acid mixture comprising about 10% by weight and a temperature of about room temperature, a diffusion time on the order of about 3 to 10 minutes is obtained with moderate agitation. The diffusion rate is increased and thereby the time is shortened, if desired, by elevating the temperature and/or increasing the amount of alcohol employed. Agitation of the mixture will be found advantageous in all cases and particularly in respect to accelerating the diffusion of the acid in the alcoholic solution. At any rate when diffusion is accomplished the liquid alcoholic phase of the mixture of the oxidation products is separated from the solid acid by any convenient conventional means, for example by filtration, and the solid acid cake is water-washed with fresh water at least once to remove any entrained residual metal-water-alcohol material from the alcohol treatment in the preceding step. When the acid cake is water-washed to the desired degree of purity, it can be recovered and dried, if desired, in any conventional fashion such as in a vacuum dryer.

To facilitate the understanding of the invention, certain details and illustrative embodiments will now be set forth; however, of course, it is to be fully understood and appreciated that the invention is not limited to the specific conditions or details set forth in these examples, since the process is capable of many modifications and variations and conditions, such modifications and variations being aided, suggested, or indicated by the discussion of the process as found herein and the discussion of the trends of the effect of the various factors.

EXAMPLE

To a five gallon stainless steel autoclave (note: regular steel is suitable) 1000 grams of 2,6-dimethylnaphthalene, 5730 grams of $Na_2Cr_2O_7 \cdot 2H_2O$ and 9.9 liters of water is added. The mixture is heated to about 520° F. for about four hours at autogenous pressure and then cooled to room temperature. The reaction product is filtered to remove the apple-green $Cr_2O_3$ powder. To the clear filtrate containing the disodium salt of 2,-naphthalendicarboxylic acd 1250 grams of $H_2SO_4$ (i.e., in the form of about a 35 percent aqueous concentration) is slowly added and the filtrate and acid turned to a paste-like material comprising a hydrated form of the dicarboxylic acid. (Note: in some cases some clear liquid forms and if so that paste material is easily separated.) The paste-like crude dicarboxylic acid is washed free of the process impurities by adding about a 50/50 methanol-water mixture equal in volume to the paste-like dicarboxylic acid and allowing the dicarboxylic acid paste and the alcohol-water mixture to completely interfuse as determined by observation. The mixture is then filtered to recover a filter cake of solid dicarboxylic acid which is water washed and vacuum dried to a dry white highly pure extremely fine powder. Yields of the dicarboxylic acid typically are quantitative.

What is claimed is:

1. In a process of preparing aromatic carboxylic acids wherein the alkyl group on an alkyl aromatic hydrocarbon containing from about 7 to 50 carbon atoms is first oxidized with an alkali metal chromate to form an alkali metal salt of an aromatic carboxylic acid, and which salt is hydrolyzed with a mineral acid to form an impure paste-like hydrate of the corresponding carboxylic acid, the improvement comprising separating and purifying said carboxylic acid from said impure carboxylic paste by adding a mixture of water and an alkanol of 1 to 3 carbon atoms to said impure carboxylic acid paste in a ratio of from about 0.5/1 to 2/1 volume of water and alkanol to carboxylic acid paste, separating said carboxylic acid from said mixture of alkanol and water, followed by water washing and drying the purified solid carboxylic acid.

2. A process according to claim 1 wherein the alkanol employed with the water to interfuse with the carboxylic acid paste is methanol.

3. A process according to claim 2 wherein the aromatic carboxylic acid prepared is a dicarboxylic acid.

4. A process according to claim 3 wherein the aromatic carboxylic acid prepared is a fused-ring polycyclic aromatic carboxylic acid.

5. A process according to claim 3 wherein the aromatic carboxylic acid prepared is 2,6-naphthalene dicarboxylic acid.

6. A process according to claim 5 wherein the oxidizing agent employed is sodium dichromate.

7. A process according to claim 5 wherein the acid employed to hydrolyze the sodium carboxylic acid salt is sulfuric acid.

8. A process according to claim 7 wherein the alkanol-water interfusion is at about room temperature.

9. A process according to claim 8 wherein the temperature during the oxidation is in the range of about 500° to 540° F.

10. The process of claim 9 wherein the volume ratio of methanol to water used is about 1/1 and the volume ratio of water and methanol to carboxylic acid paste is about 1/1.

References Cited

UNITED STATES PATENTS

| | | | |
|---|---|---|---|
| 1,998,925 | 4/1935 | Demant | 260—524 |
| 3,209,024 | 9/1965 | McNelis et al. | 260—525 |
| 3,330,862 | 7/1967 | Borkowski et al. | 260—524 |

LORRAINE A. WEINBERGER, Primary Examiner

R. S. WEISSBERG, Assistant Examiner

U.S. Cl. X.R.

260—525